(12) United States Patent
Motojima et al.

(10) Patent No.: US 7,407,399 B2
(45) Date of Patent: Aug. 5, 2008

(54) CARD CONNECTOR

(75) Inventors: Joe Motojima, Tokyo (JP); Akihiro Matsunaga, Tokyo (JP); Akira Natori, Tokyo (JP); Keiichiro Suzuki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/795,076

(22) PCT Filed: Apr. 14, 2006

(86) PCT No.: PCT/JP2006/308378

§ 371 (c)(1),
(2), (4) Date: Jul. 11, 2007

(87) PCT Pub. No.: WO2006/115184

PCT Pub. Date: Nov. 2, 2006

(65) Prior Publication Data

US 2008/0009163 A1    Jan. 10, 2008

(30) Foreign Application Priority Data

Apr. 21, 2005    (JP)    ............................ 2005-124318

(51) Int. Cl.
H01R 13/62    (2006.01)
(52) U.S. Cl. ........................................................ 439/159
(58) Field of Classification Search ................. 439/159, 439/630, 160
See application file for complete search history.

(56) References Cited

U.S. PATENT DOCUMENTS

| 6,382,995 | B1 | 5/2002 | Bricaud et al. |
| 6,692,276 | B1 | 2/2004 | Abe et al. |
| 6,929,490 | B2 * | 8/2005 | Kodera et al. ............... 439/159 |
| 7,070,430 | B2 * | 7/2006 | Yang et al. .................. 439/159 |
| 2004/0266237 | A1 * | 12/2004 | Kodera et al. ............... 439/159 |
| 2005/0186817 | A1 * | 8/2005 | Yang et al. .................. 439/159 |
| 2006/0166533 | A1 * | 7/2006 | Muramatsu et al. ......... 439/160 |
| 2007/0207650 | A1 * | 9/2007 | Saito et al. .................. 439/159 |

FOREIGN PATENT DOCUMENTS

| JP | 2000-260524 A | 9/2000 |
| JP | 2001-135410 A | 5/2001 |

(Continued)

OTHER PUBLICATIONS

International Search Report.

*Primary Examiner*—Gary F. Paumen
(74) *Attorney, Agent, or Firm*—Collard & Roe, P.C.

(57) ABSTRACT

A card connector for connecting an electronic card with an electronic device is disclosed. The connector comprises a base member and a metal cover (10), which define a receptacle for receiving at least partially the electronic card therein. The connector further comprises an ejection mechanism for ejecting the electronic card, at least in part, from the receptacle. The ejector mechanism comprises: a cam portion (60) which provides a cam path; a cam follower (50); and a resilient supporter (40) which supporter supports the cam follower (50) to allow the cam follower (50) to travel along the cam path. The ejection mechanism is formed integrally with the metal cover (10). Instead, the cam portion (60) may be formed integrally with the base member.

24 Claims, 20 Drawing Sheets

FOREIGN PATENT DOCUMENTS

| | | |
|---|---|---|
| JP | 2001-135424 A | 5/2001 |
| JP | 2002-517834 A | 6/2002 |
| JP | 2004-281100 A | 10/2004 |
| JP | 2005-063746 A | 3/2005 |
| JP | 2006-114437 A | 4/2006 |
| WO | WO 99/63474 | 12/1999 |

* cited by examiner

CARD CONNECTOR

CROSS REFERENCE TO RELATED APPLICATIONS

Applicants claim priority under 35 U.S.C. §119 of Japanese Application No. 2005-124318 filed Apr. 21, 2005. Applicants also claim priority under 35 U.S.C. §365 of PCT/JP2006/308378 filed Apr. 14, 2006. The international application under PCT article 21(2) was published in English.

TECHNICAL FIELD

This invention relates to a card connector for use in connecting an electronic card with an electronic device. For example, the electronic card is a Secure Digital card or a Multi Media Card. For example, the electronic device is a digital camera, a mobile phone or a portable digital music player.

BACKGROUND ART

JP-A 2004-281100 discloses a connector of this type. The disclosed connector has an ejection mechanism which is referred to as a push-push type ejection mechanism, a two-stage ejection mechanism or a double click ejection mechanism. The ejection mechanism comprises a slider, a spring and a cam follower, which are individual parts. The slider is formed with a cam recess which has typically a heart-like shape. The spring urges the slider rearwards, while the slider is pushed forwards by an inserted card. The cam follower projects into the cam recess. The combination of the cam follower and the cam recess locks the slider in a forward position upon the slider is pushed forwards for the first time. When the slider is pushed forwards from its locking position for the second time, the ejection mechanism releases the slider to move it rearwards by using the spring's force so that the inserted card is also ejected rearwards.

DISCLOSURE OF INVENTION

It is an object of the present invention to provide a card connector which has the improved ejection mechanism comprised of less parts but having an equivalent ejection function.

In accordance with one aspect of the present invention there is provided a card connector for connecting an electronic card with an electronic device. The card connector comprises a base member, a metal cover and an ejection mechanism. The base member and the metal cover define a receptacle for receiving at least partially the electronic card therein. The ejection mechanism for ejecting the electronic card, at least in part, from the receptacle comprises a cam portion, a cam follower and a resilient supporter. The cam portion forms, at least in part, a cam path. The resilient supporter is formed integrally with the metal cover and supports the cam follower to allow the cam follower to travel along the cam path.

An appreciation of the objectives of the present invention and a more complete understanding of its structure may be had by studying the following description of the preferred embodiment and by referring to the accompanying drawings.

Figure 1:
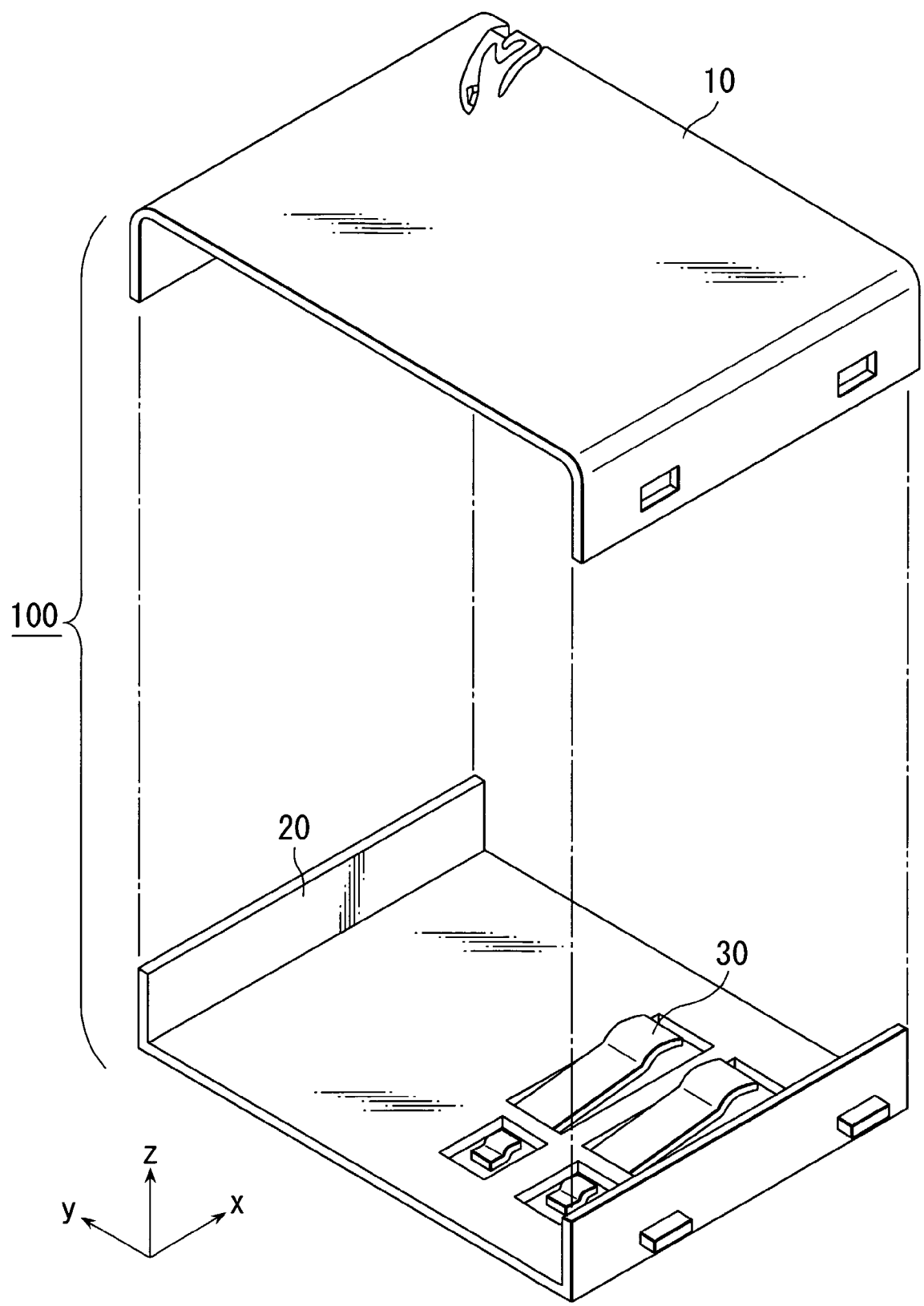
FIG. 1 is an exploded, perspective view showing a card connector in accordance with a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

BEST MODE FOR CARRYING OUT THE INVENTION

First Embodiment

With reference to FIG. 1, a card connector 100 according to a first embodiment of the present invention comprises a metal cover 10 and an insulative base member 20. The metal cover 10 and the base member 20 define a receptacle for receiving, at least in part, an electronic card therein. The base member 20 holds a plurality of electrical contacts 30; only two electrical contacts 30 are shown in FIG. 1, for the sake of simplification. The electrical contacts 30 project in the receptacle along a Z-direction. The electrical contacts 30 serve as springs so that, when a card is inserted into the receptacle along an X-direction, the electrical contacts 30 push the inserted card onto the metal cover 10 upwards along the Z-direction.

Figure 2:
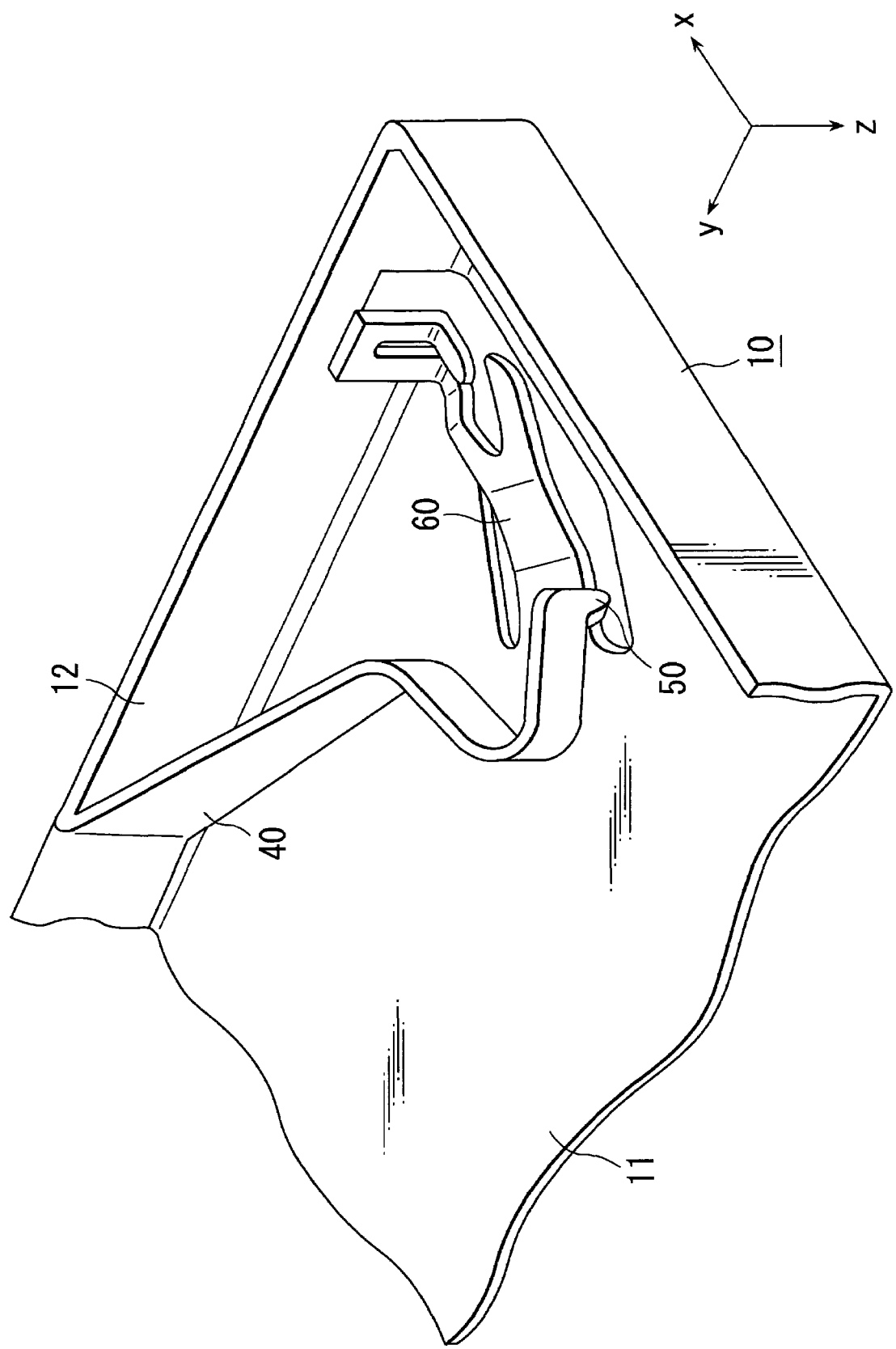
FIG. 2 is a perspective view showing, in part, a metal cover included in the card connector of FIG. 1, wherein a cam portion, a cam follower and a resilient supporter are formed integrally with the metal cover.

With reference to FIG. 2, the metal cover 10 of the present embodiment is provided with an ejection mechanism which is comprised of a resilient supporter 40, a cam follower 50 and a cam portion 60. In this embodiment, the resilient supporter 40, the cam follower 50 and the cam portion 60 are formed integrally with the metal cover 10. The metal cover 10 includes a general plate portion 11 and a front end wall 12. The general plate portion 11 is laid on an XY plane. The front end wall 12 stands up from the front edge of the general plate portion 11 along the Z-direction, while extending along a Y-direction. In other words, the front end wall 12 is laid on a YZ plane. The general plate portion 11 is provided with the cam portion 60. The front end wall 12 is provided with the resilient supporter 40. The resilient supporter 40 extends from the front end wall 12 and has a free end. The cam follower 50 is supported by the free end of the resilient supporter 40, while being allowed to travel along the cam path.

Figure 3:
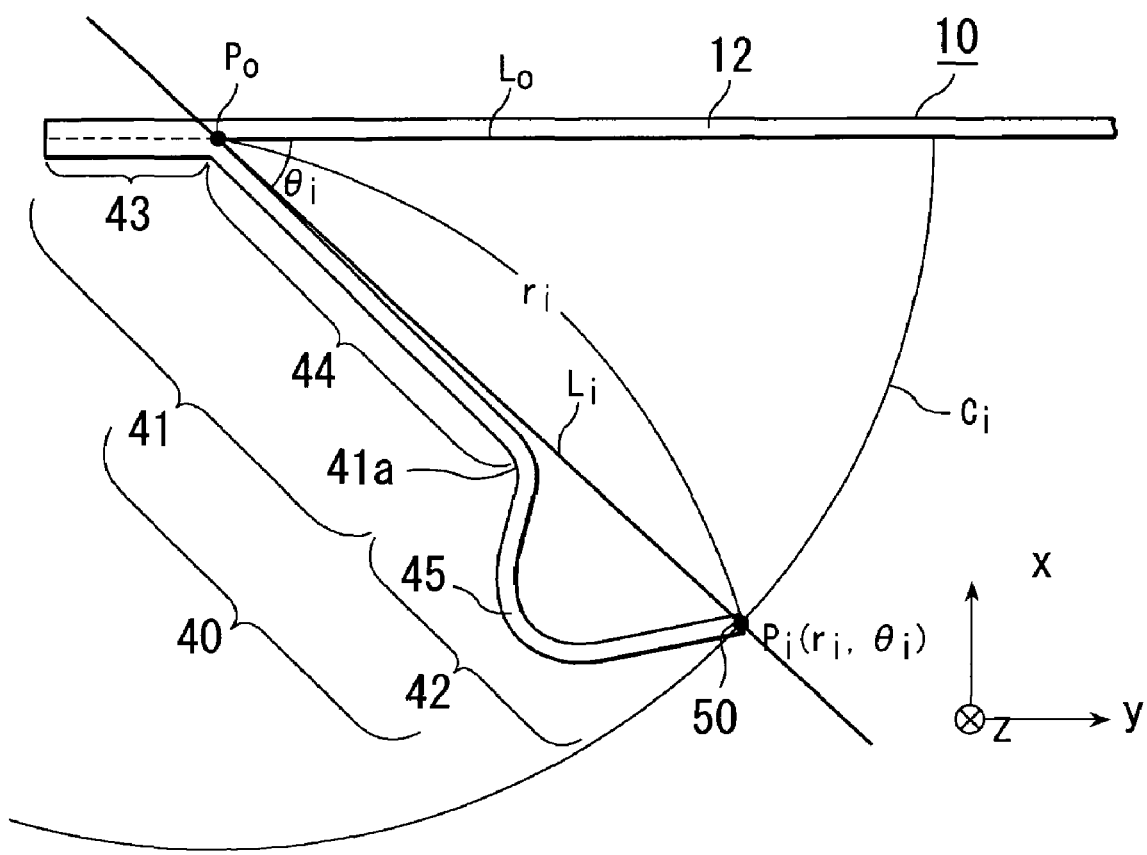
FIG. 3 is a schematic view showing a control of the cam follower's position by the resilient supporter of FIG. 2.

With reference to FIG. 3, polar coordinate system based expressions are also used to explain the resilient supporter 40 and the cam follower 50 in addition to the above-used XY(Z) coordinate system based expressions, where X=−r sin θ, Y=r cos θ. In this embodiment, an origin line $L_o$ of the polar coordinate plane is selected as a line which is obtained by projecting the front end wall 12 on the XY plane, while an origin point $P_o$ is selected as a point at which the resilient supporter 40 is branched off from the front end wall 12. The origin line $L_o$ is not real line but is an imaginary line used merely for describing the movements of the cam follower 50 and the resilient supporter 40. The front end wall 12 is not required to define the original line $L_o$. Therefore, the front end wall 12 is not limited to have a planer surface like the present embodiment but may have a curved surface.

The resilient supporter 40 urges the cam follower 50 to be positioned at an initial position $P_i$ ($r_i$, $θ_i$). The initial position $P_i$ ($r_i$, $θ_i$) is an intersection point of a predetermined circle $C_i$ and a predetermined straight line $L_i$.

The resilient supporter 40 comprises a first portion 41 and a second portion 42. The first portion 41 is for providing the cam follower 50 with a circumferential force that urges the cam follower 50 to be on the predetermined line $L_i$. The first portion 41 has an end 41a, to which the second portion 42 is connected. The second portion 42 is for providing the cam follower 50 with a radial force that urges the cam follower 50 to be on the predetermined circle $C_i$. The second portion 42 supports the cam follower 50 at its free end. The supported cam follower 50 projects along the Z-direction.

The first portion 41 comprises a base portion 43 and a movable portion 44. The base portion 43 extends in parallel with the origin line $L_o$. The movable portion 44 is connected with the base portion 43 at the origin point $P_o$ and has an end 41a. The movable portion 44 straightly extends from the origin point $P_o$ to the end 41a. The end 41a is regulated to be on a concentric but smaller circle of the predetermined circle $C_i$.

The second portion 42 is provided with a bent portion 45. The bent portion 45 is positioned farther from the origin line $L_o$ than the end 41a of the first portion 41 in a circumferential direction on the polar coordinate plane. The bent portion 45 serves as a transmission portion which transmits an insertion force of the electronic card to the cam follower 50 upon the card insertion while transmitting a movement of the cam follower 50 as an ejection force to the electronic card upon the card ejection.

Figure 4:
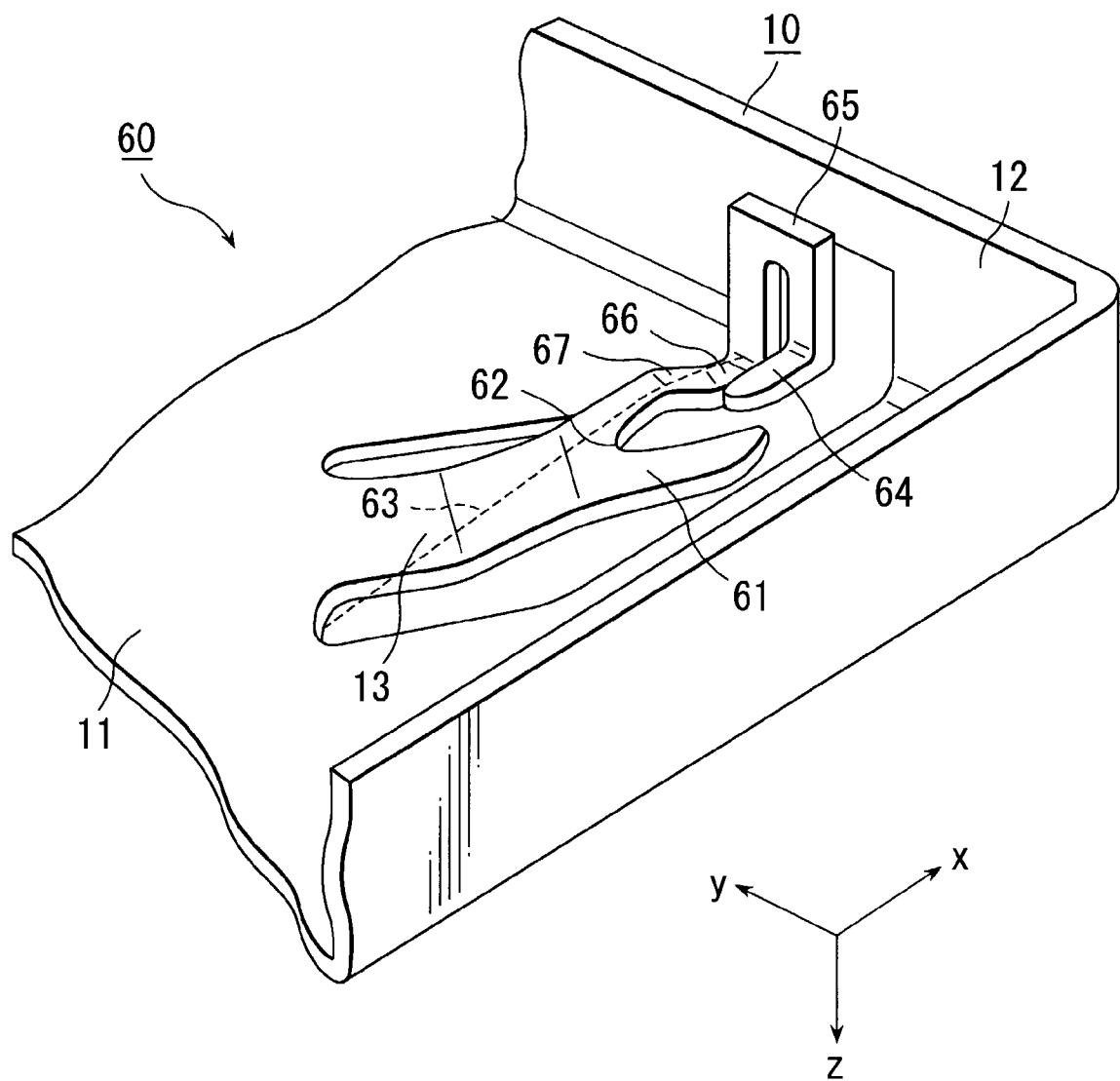
FIG. 4 is a perspective view showing the cam portion of FIG. 2.

With reference to FIG. 4, the cam portion 60 comprises a first guide portion 61, a receiving portion 62, a second guide portion 63 and a supplemental portion 64. The illustrated cam portion 60 defines the cam path on the XY plane, as seen from the Z-direction. In this embodiment, the first guide portion 61, the receiving portion 62, the second guide portion 63 and the supplemental guide portion 64 are formed integrally with each other so that the cam portion 60 is formed integrally with the metal cover 10.

The cam portion 60 of this embodiment is obtainable by stamping out a mother material of the metal cover 10 to form a predetermined piece 13 which has a mitten-like shape and extends from the general plate portion 11 of the metal cover 10, followed by bending the predetermined piece two times or more.

Note here that the illustrated embodiment can fully and effectively use the internal space of the receptacle by turning even a dead space to practical use. Known is a major kind of electronic card having a standardized cut corner potion or beveled corner portion. The cut corner defines a particular triangle space within the receptacle when the electronic card is inserted into the receptacle. The particular triangle space often becomes a dead space. The illustrated cam portion 60 can be disposed within the particular triangle space.

Figure 5:
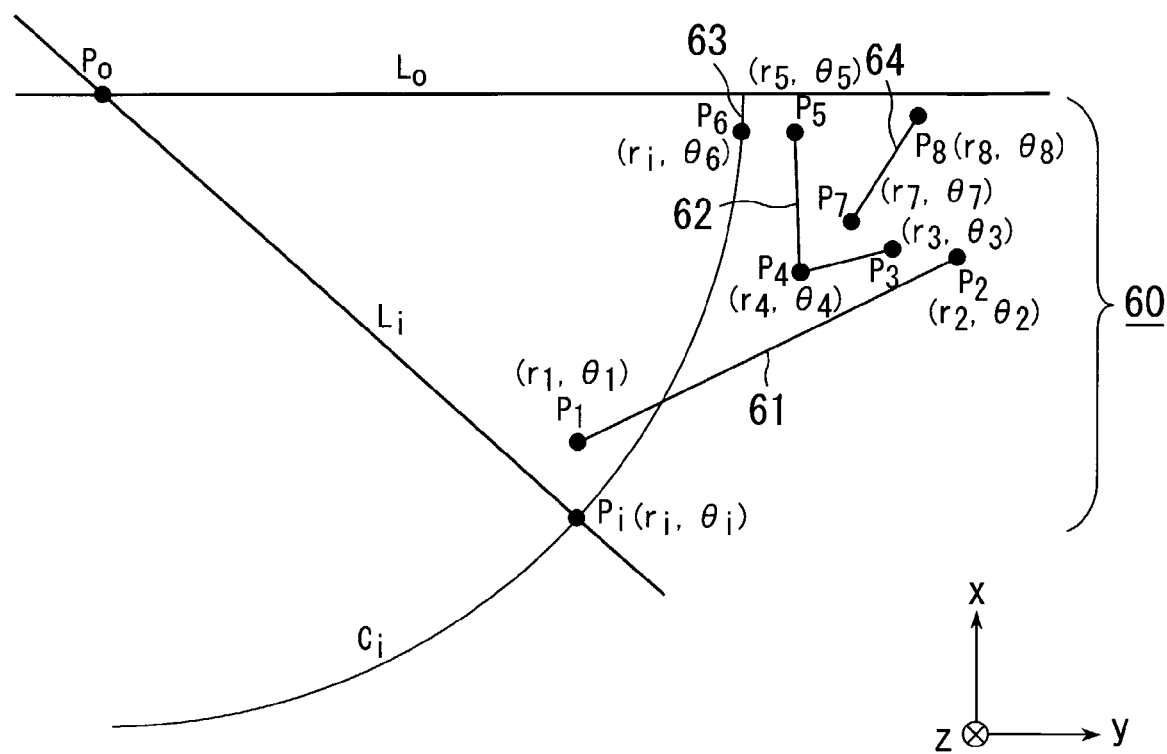
FIG. 5 is a schematic view showing a requirement on design for the cam portion of FIG. 2.

With reference also to FIG. 5, detail explanation will be made about conditions the cam portion 60 should meet.

The first guide portion 61 constitutes a guide line segment which extends from a first point $P_1$ ($r_1$, $θ_1$) to a second point $P_2$ ($r_2$, $θ_2$). The illustrated first guide portion 61 is constituted by an edge of the mitten-like shaped predetermined piece 13. The guide line segment is not limited to a straight line segment but may be a curved line segment, provided that the guide line segment is a continuum line. The guide line segment intersects the predetermined circle $C_i$ at an additional intersection point which is identified by the predetermined radius $r_i$ and an additional predetermined angle smaller than the predetermined angle $θ_i$.

To meet the above-mentioned requirements, the first point $P_1$ is located within the inside region with respect to the predetermined circle $C_i$, while the second point $P_2$ is located within the outside region with respect to the predetermined circle $C_i$. In addition, the angle $θ_1$ is greater than the angle $θ_2$. In this embodiment, the radius $r_1$ is shorter than the radius $r_2$ but may be longer than the radius $r_2$. In other words, the first point $P_1$ may be located within the outside region with respect to the predetermined circle $C_i$, while the second point $P_2$ may be located within the inside region with respect to the predetermined circle $C_i$.

The receiving portion 62 is for receiving the cam follower 50. The illustrated receiving portion 62 is constituted by another edge of the mitten-like shaped predetermined piece 13. The receiving portion 62 forms a V-like line which passes through a third point $P_3$ ($r_3$, $\theta_3$), a fourth point $P_4$ ($r_4$, $\theta_4$) and a fifth point $P_5$ ($r_5$, $\theta_5$) in this order. The third to the fifth points $P_3$ to $P_5$ are located within the outside region with respect to the predetermined circle $C_i$. The third to the fifth points $P_3$ to $P_5$ must be located on the same region as the second point $P_2$ with respect to the predetermined circle $C_i$. In other words, if the second point $P_2$ is positioned within the outside region of the predetermined circle $C_i$, the third to the fifth points $P_3$ to $P_5$ are also positioned with in the outside region.

For smooth receiving and guiding of the cam follower 50, the third to the fifth points $P_3$ to $P_5$ should meet the following conditions: the angle $\theta_3$ is greater than the angle $\theta_2$; the third point $P_3$ is positioned between the second point $P_2$ and the predetermined circle $C_i$ in a radial direction on the polar coordinate plane; the angle $\theta_4$ is greater than the angle $\theta_3$; the fourth point $P_4$ is positioned between the third point $P_3$ and the predetermined circle $C_i$ in the radial direction; the angle $\theta_5$ is smaller than the fourth angle $\theta_4$.

The second guide portion 63 is for guiding the cam follower 50 from a sixth point $P_6$ ($r_i$, $\theta_6$) to the initial position $P_i$ ($r_i$, $\theta_i$) upon the ejection of the electronic card. In this embodiment, the second guide portion 63 uses the circumferential force of the first portion 41 of the resilient supporter 40 for the guide of the cam follower 50. The sixth point $P_6$ is located on the predetermined circle $C_i$ and corresponds to the fifth point $P_5$. In this embodiment, the angle $\theta_6$ is equal to the angle $\theta_5$.

In this embodiment, the second guide portion 63 is constituted by a surface of the mitten-like shaped predetermined piece 13 and is formed with a depression portion 66 and a slope portion 67. The depression portion 66 is positioned on the sixth point $P_6$. The depression portion 66 is depressed downwardly in the Z-direction in comparison with the fifth point $P_5$ of the receiving portion 62. In other words, the depression portion 66 is positioned downwardly in a projection orientation of the cam follower 50 in comparison with the fifth point $P_5$ of the receiving portion 62. The depression portion 66 serves to guide the cam follower 50 on the predetermined circle $C_i$ after the cam follower 50 passes through the fifth point $P_5$. The slope portion 67 is positioned on the predetermined circle $C_i$. The slope portion 67 is sloped towards an orientation opposed to the projection orientation of the cam follower 50 in Z-direction. The slope portion 67 serves to guide the cam follower 50 towards the initial position $P_i$ over the additional intersection point after the cam follower 50 is away from the sixth point $P_6$.

The supplemental guide portion 64 is for guiding the cam follower 50 towards the receiving portion 63 after the cam follower 50 passes through the second point $P_2$ upon the card insertion. In this embodiment, the cam portion 60 further comprises a connection portion 65, by which the supplemental guide portion 64 is connected with the depression portion 66.

The supplemental guide portion 64 constitutes a supplemental guide line segment which extends from a first supplemental point $P_7$ ($r_7$, $\theta_7$) to a second supplemental point $P_8$ ($r_8$, $\theta_8$). The supplemental guide line segment is not limited to a straight line segment but may be a curved line segment, provided that the supplemental guide line segment is a continuum line. The supplemental guide line segment intersects an imaginary straight line extending between the second point $P_2$ and the fifth point $P_5$. The first supplemental angle $\theta_7$ is greater than the second supplemental angle $\theta_8$. the second supplemental angle $\theta_8$ is smaller than the second angle $\theta_2$.and the fifth angle $\theta_5$. The second supplemental point $P_8$ is positioned between the second point $P_2$ and the predetermined circle $C_i$ in the radial direction. In this embodiment, the first supplemental point $P_7$ is also positioned between the third point $P_3$ and the predetermined circle $C_i$ in the radial direction.

The cam portion 60 of this embodiment is obtainable by stamping out a mother material of the metal cover 10 to form a predetermined piece which has a mitten-like shape and extends from the general plate portion 11 of the metal cover 10, followed by bending the predetermined piece two times or more.

The operation of the ejection mechanism will now be described.

Figure 6:
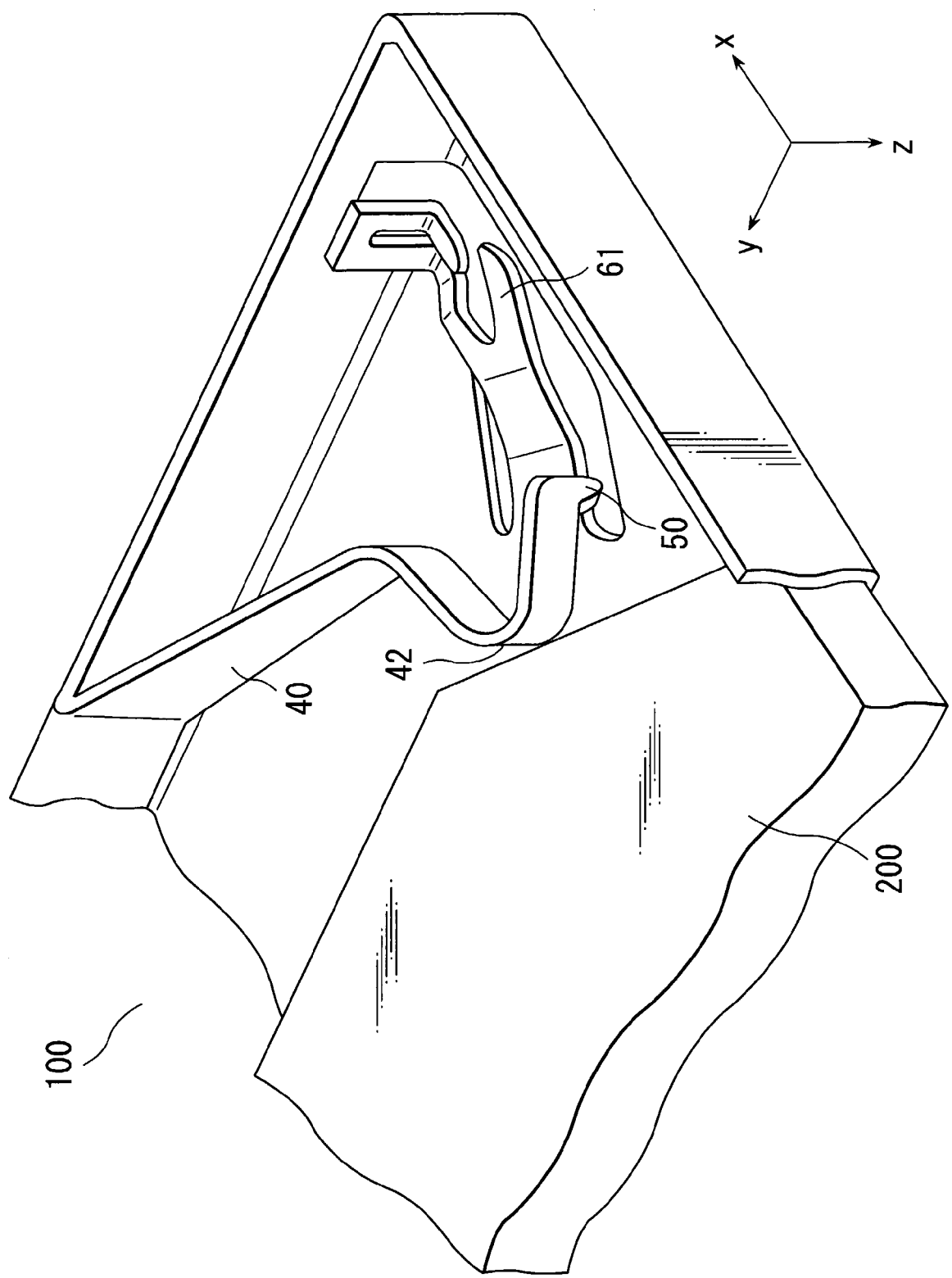
FIG. 6 is a view similar to that of FIG. 2, but in which a card insertion starts, wherein the cam follower is positioned at its initial position.
Figure 7:
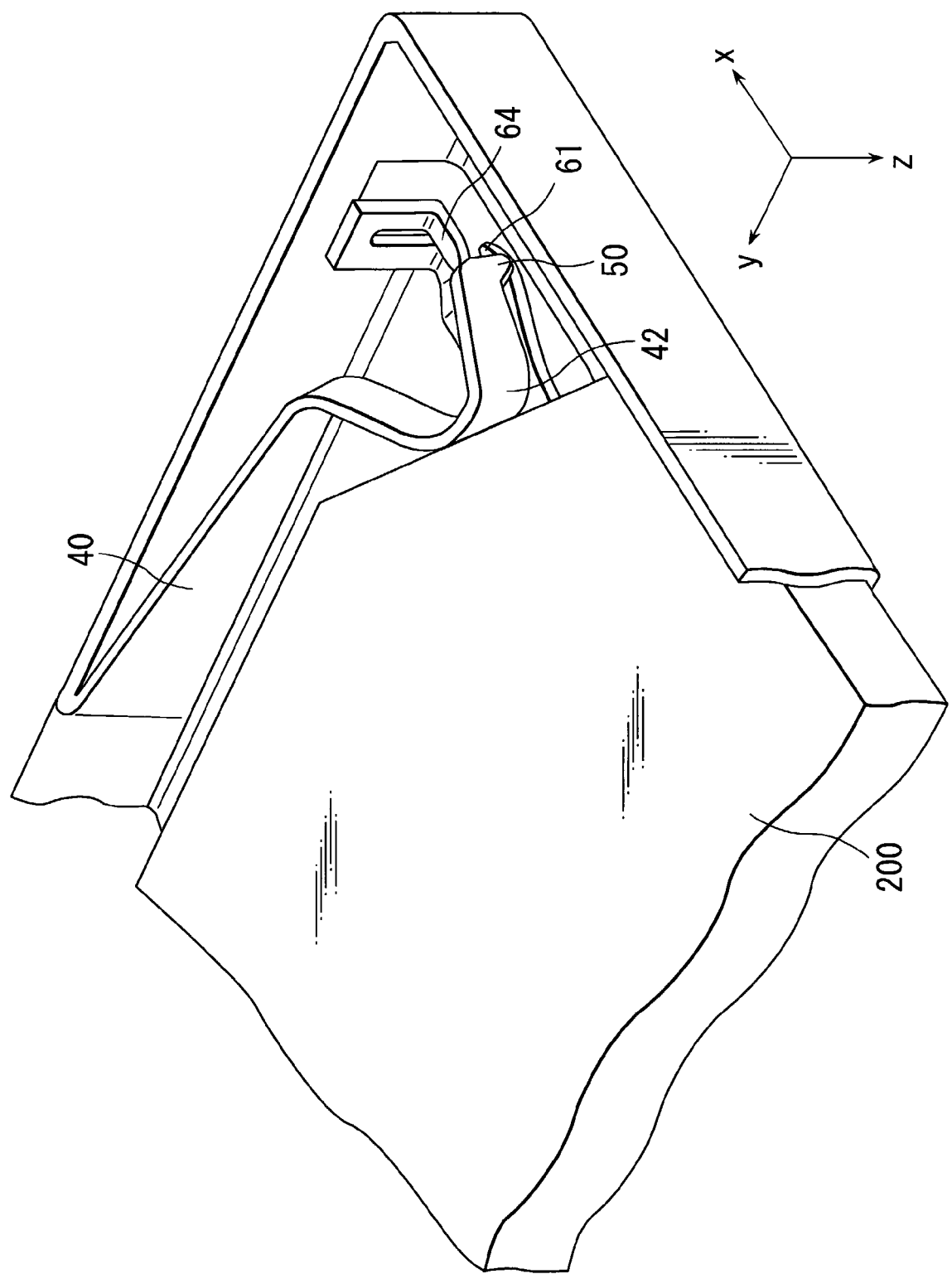
FIG. 7 is a view subsequent to FIG. 6, wherein a user pushes the card forwards for the first time so that the cam follower is guided by a first guide portion of the cam portion.
Figure 8:
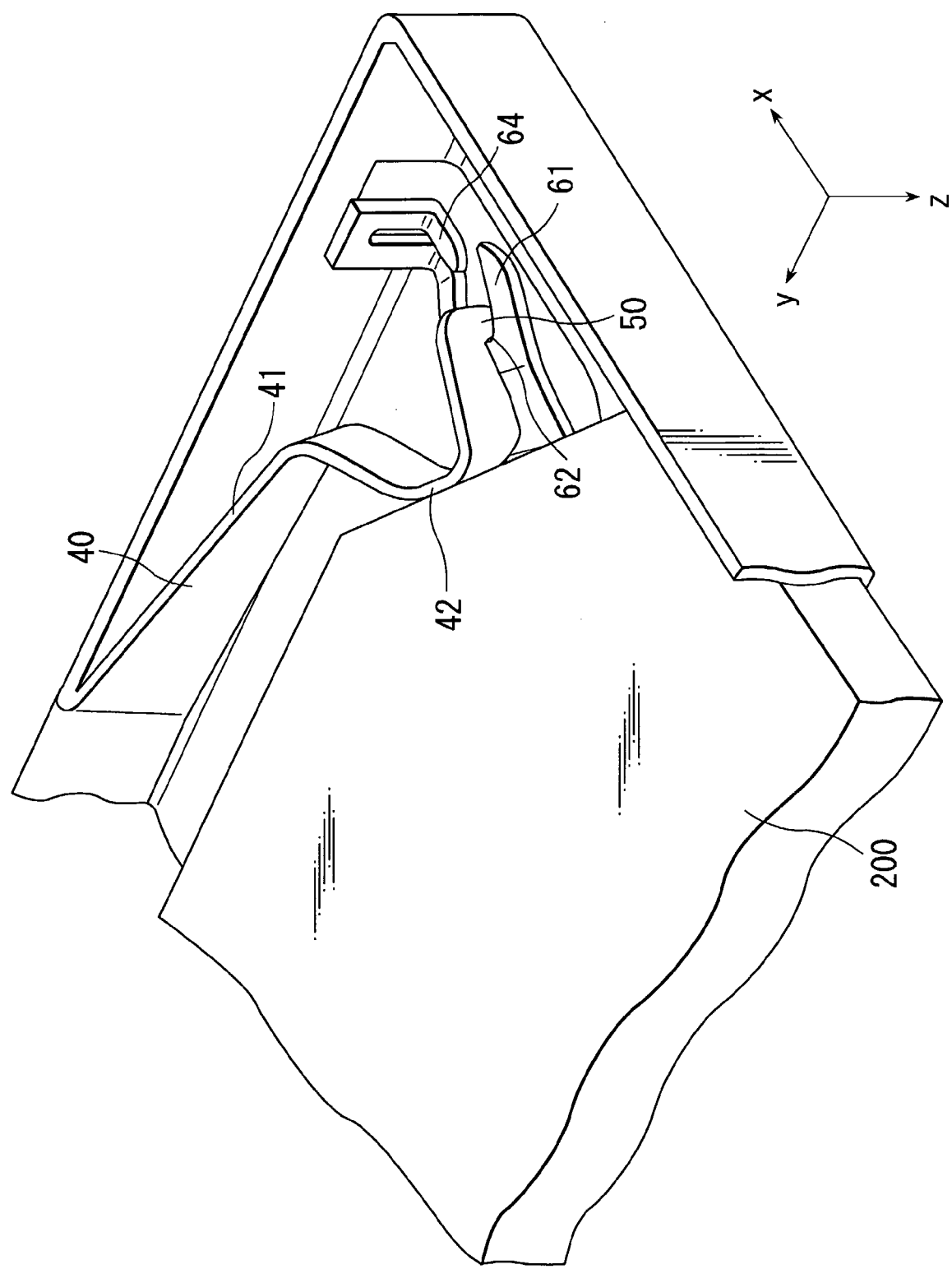
FIG. 8 is a view subsequent to FIG. 7, wherein the user stops pushing the card so that the card is received by a receiving portion of the cam portion.

As shown in FIG. 6, the cam follower 50 is positioned at its initial position $P_i$ before an electronic card 200 is brought into contact with the second portion 42 of the resilient supporter 40. When a user pushes the electronic card 200 forwards along the X-direction for the first time, the cam follower 50 is pressed onto the first guide portion 61 and is guided by the first guide portion 61, as shown in FIG. 7. When the cam follower 50 is over the first guide portion 61, the second portion 42 of the resilient supporter 40 moves the cam follower 50 inwardly in the radial direction by using its radial force so that the cam follower 50 is brought into contact with the supplemental guide portion 64. The supplemental guide portion 64 guides the cam follower 50 in cooperation with the circumference force of the first portion 41 of the resilient supporter 40 so that the cam follower 50 is received in the receiving portion 62, as shown in FIG. 8.

Figure 9:
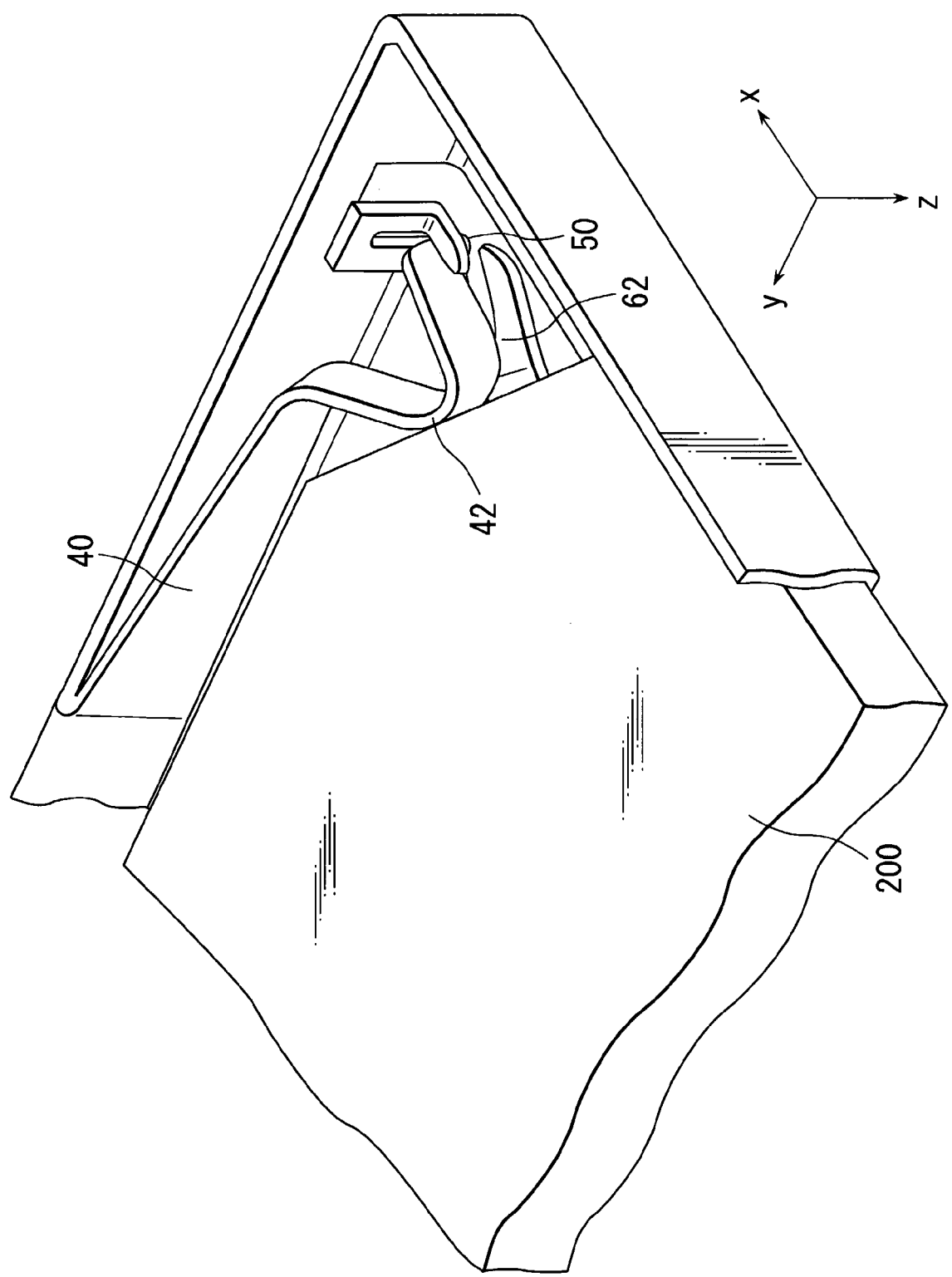
FIG. 9 is a view subsequent to FIG. 8, wherein the user pushes the card forwards for the second time.
Figure 10:
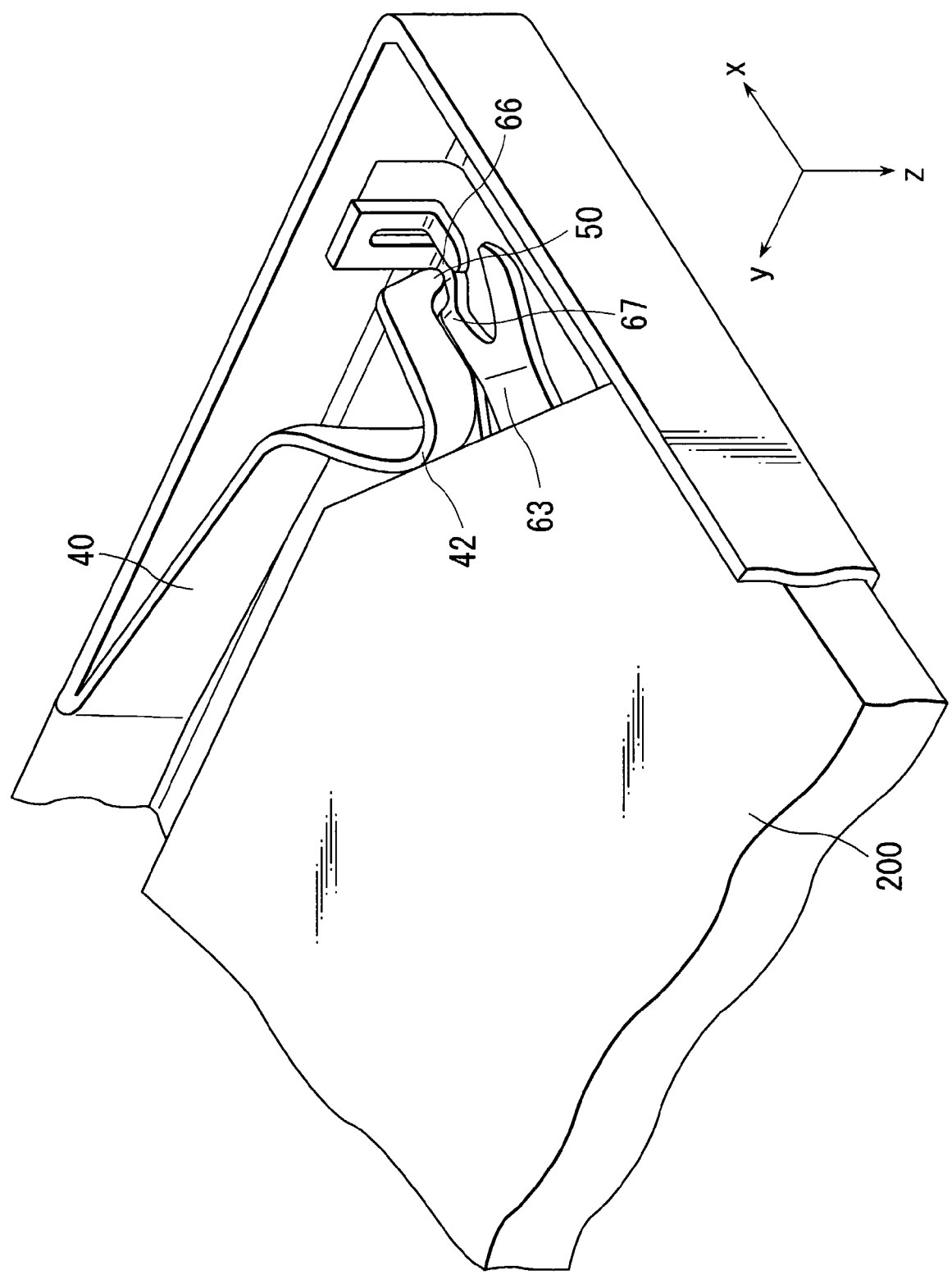
FIG. 10 is a view subsequent to FIG. 9, wherein the cam follower is moved inwards by the resilient supporter so that the cam follower is on or above a second guide portion of the cam portion.
Figure 11:
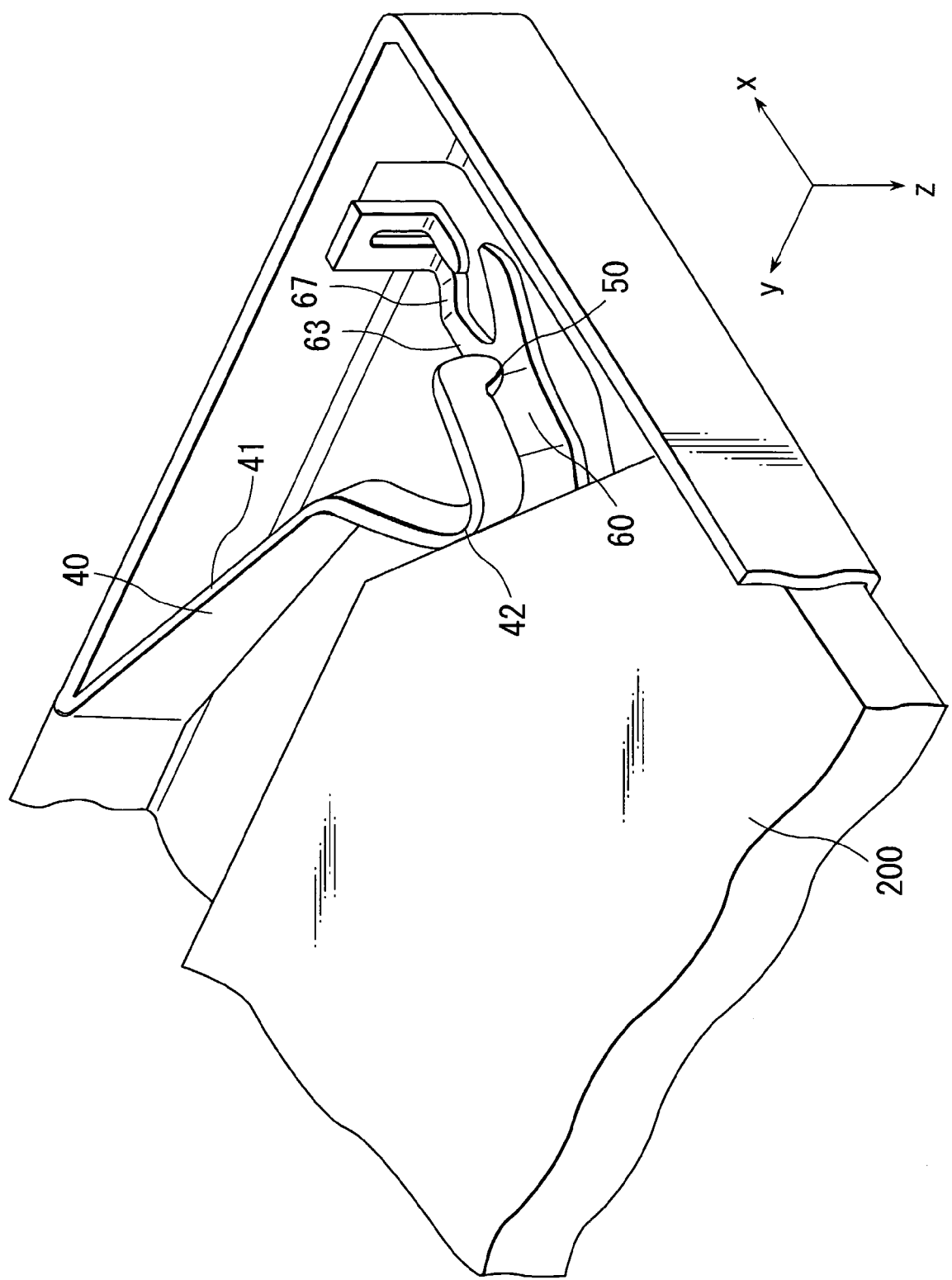
FIG. 11 is a view subsequent to FIG. 10, wherein the cam follower is moved rearwards by the resilient supporter, while being guided by the second guide portion.
Figure 12:
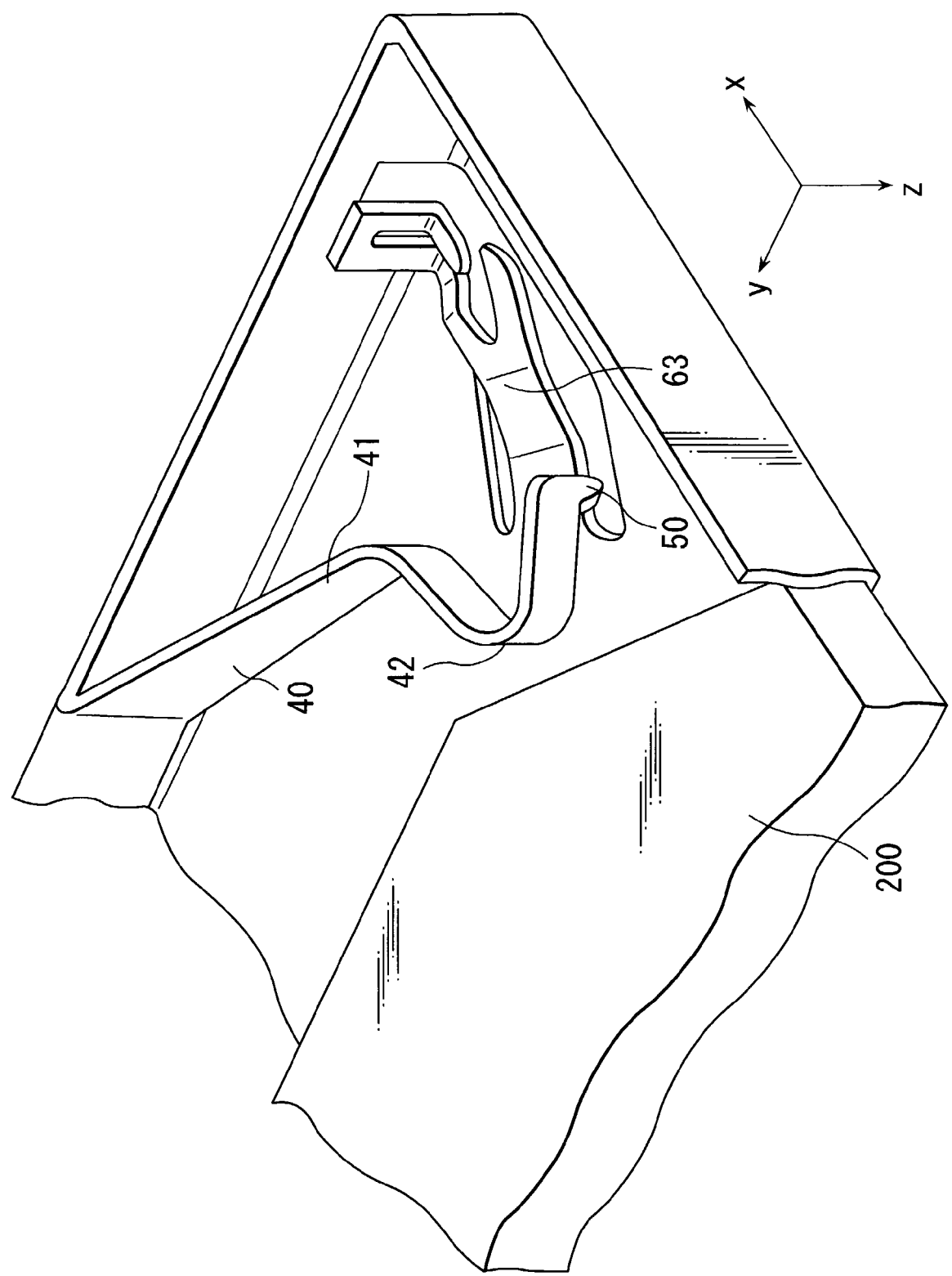
FIG. 12 is a view subsequent to FIG. 11, wherein the cam follower travels back to its initial position with the card being ejected.

When the user pushes the electronic card 200 forwards for the second time, the cam follower 50 is also moved forwards, as shown in FIG. 9. When the cam follower 50 passes through the fifth point $P_5$ of the cam path, the cam follower 50 is moved inwardly along the radial direction by the second portion 42 of the resilient supporter 40 so that the cam follower 50 is positioned on or above the depression portion 66, as shown in FIG. 10. When the user releases the electronic card 200, the cam follower 50 is moved rearwards by the resilient supporter 40. The cam follower 50 is guided by the second guide portion 63 including the slope portion 67, while the electronic card 200 is moved rearwards, as shown in FIG. 11. Then, the cam follower 50 travels back to its initial position $P_i$ with the electronic card 200 being ejected.

Figure 13:
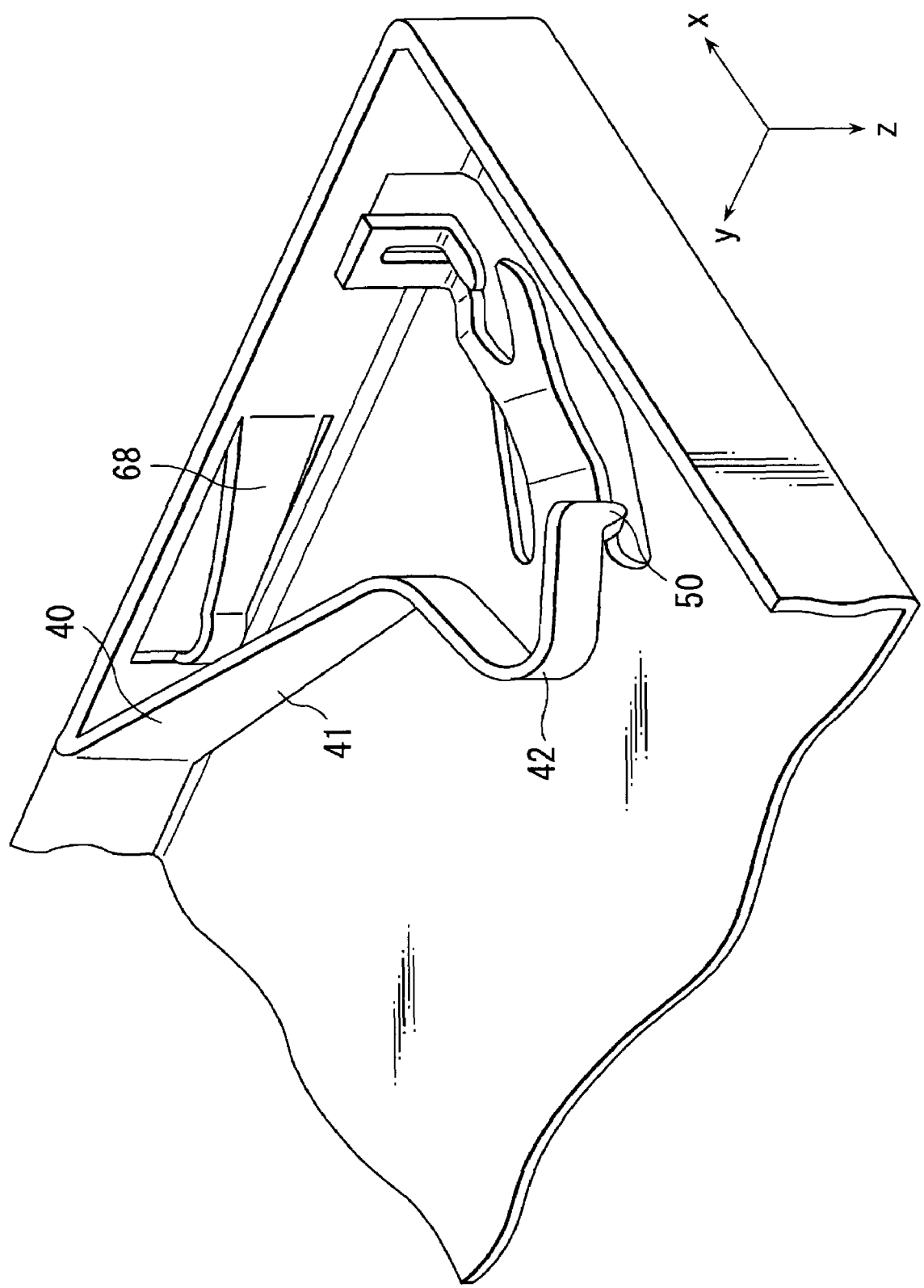
FIG. 13 is a view similar to FIG. 2, but in which a supplemental resilient portion is further shown, wherein the supplemental resilient portion is formed integrally with the metal cover.
Figure 14:
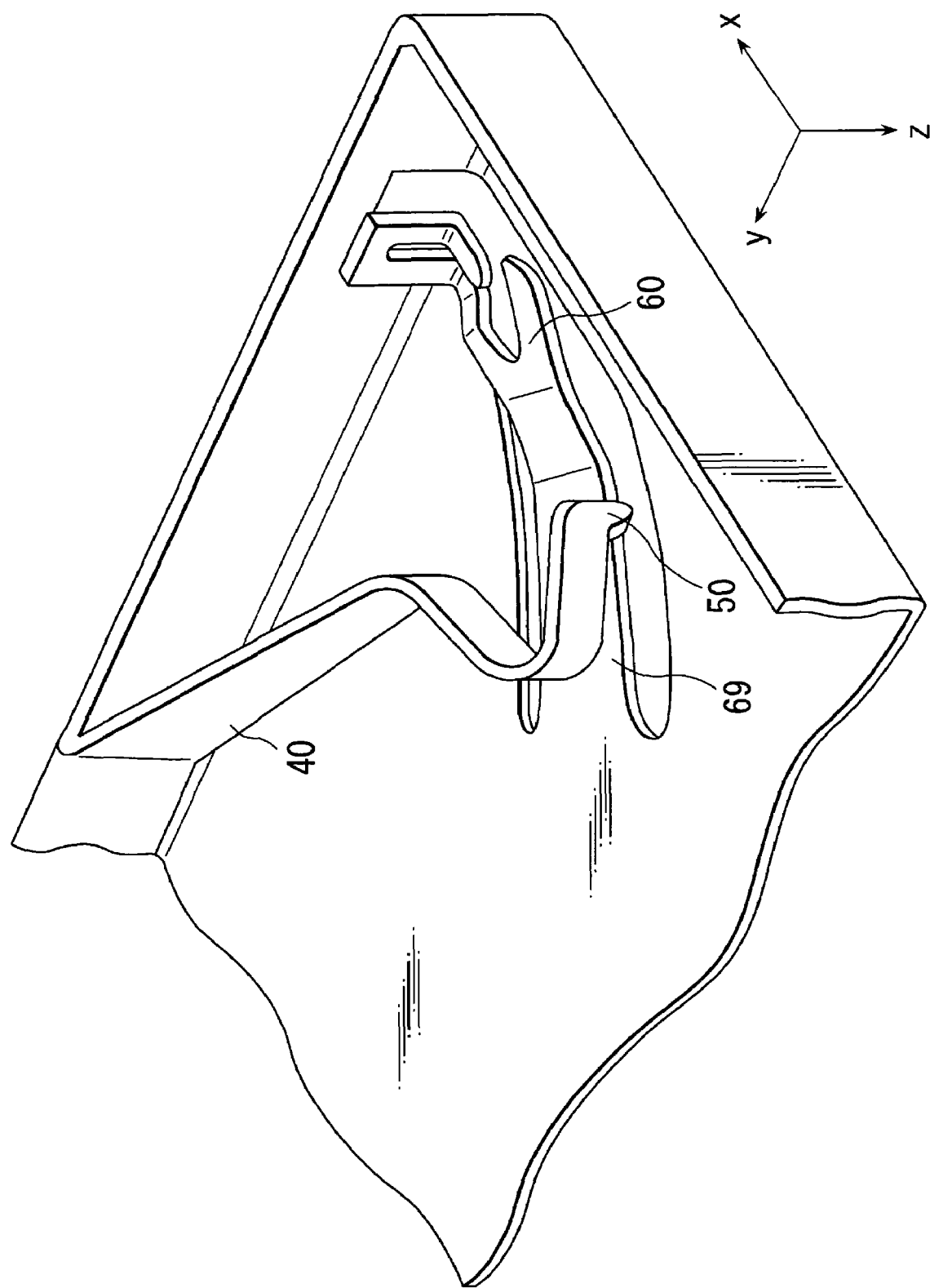
FIG. 14 is a view similar to FIG. 2, but in which its cam portion is longer than the cam portion of FIG. 2.

As shown in FIG. 13, the card connector may further comprise a supplemental resilient portion 68 for providing the resilient supporter 40 with a supplemental force for supplementing the circumferential force. The illustrated supplemental resilient portion 68 is formed integrally with the metal cover 10. Furthermore, as shown in FIG. 14, the cam portion 60 has a longer arm portion 69. In addition, the first guide portion edge of the mitten-like shaped predetermined piece 13 may be curved in order to ensure its guide ability.

Second Embodiment

Figure 15:
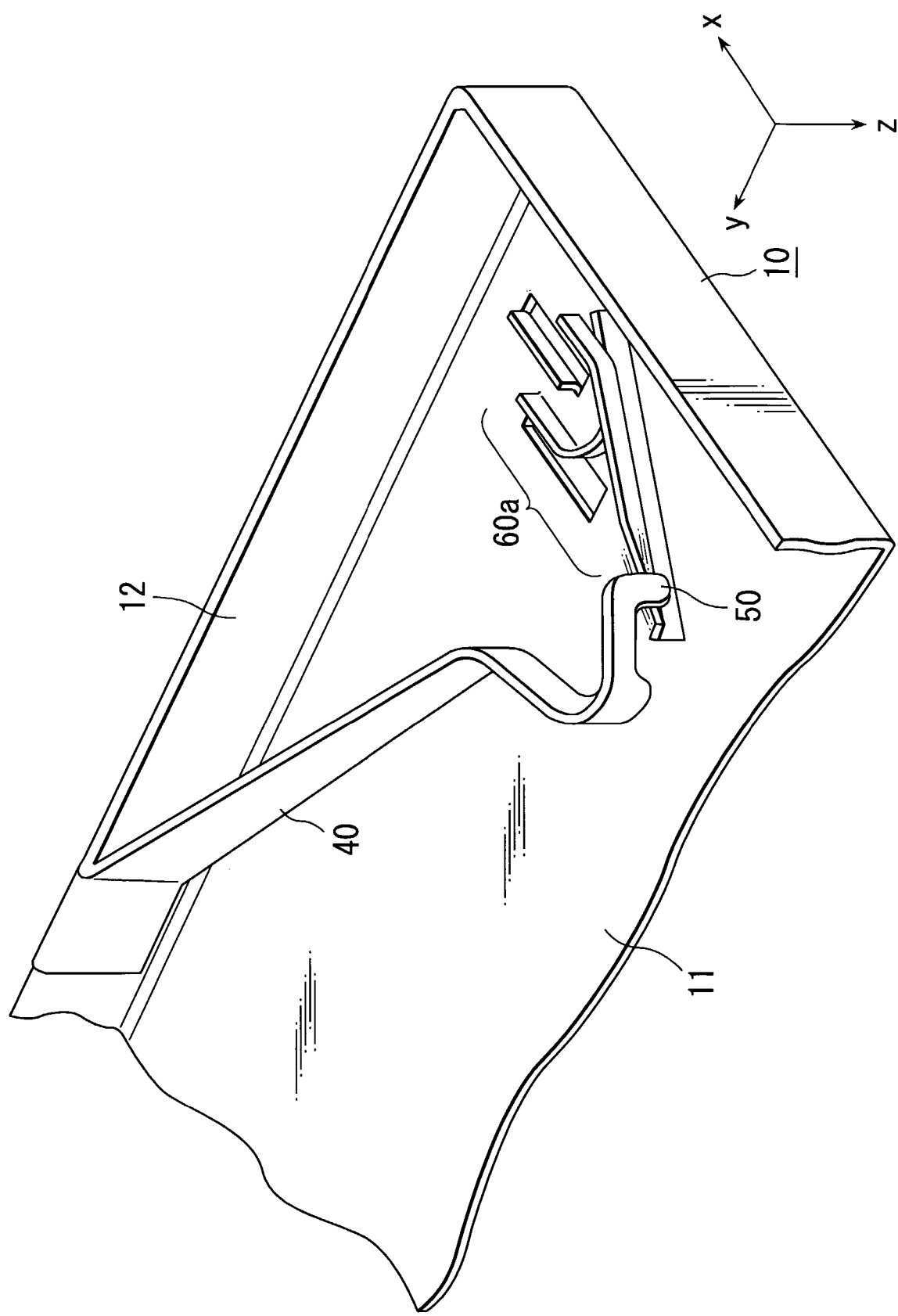
FIG. 15 is a perspective view showing, in part, a metal cover included in a card connector according to a second embodiment of the present invention, wherein a cam portion, a cam follower and a resilient supporter are formed integrally with the metal cover.
Figure 16:
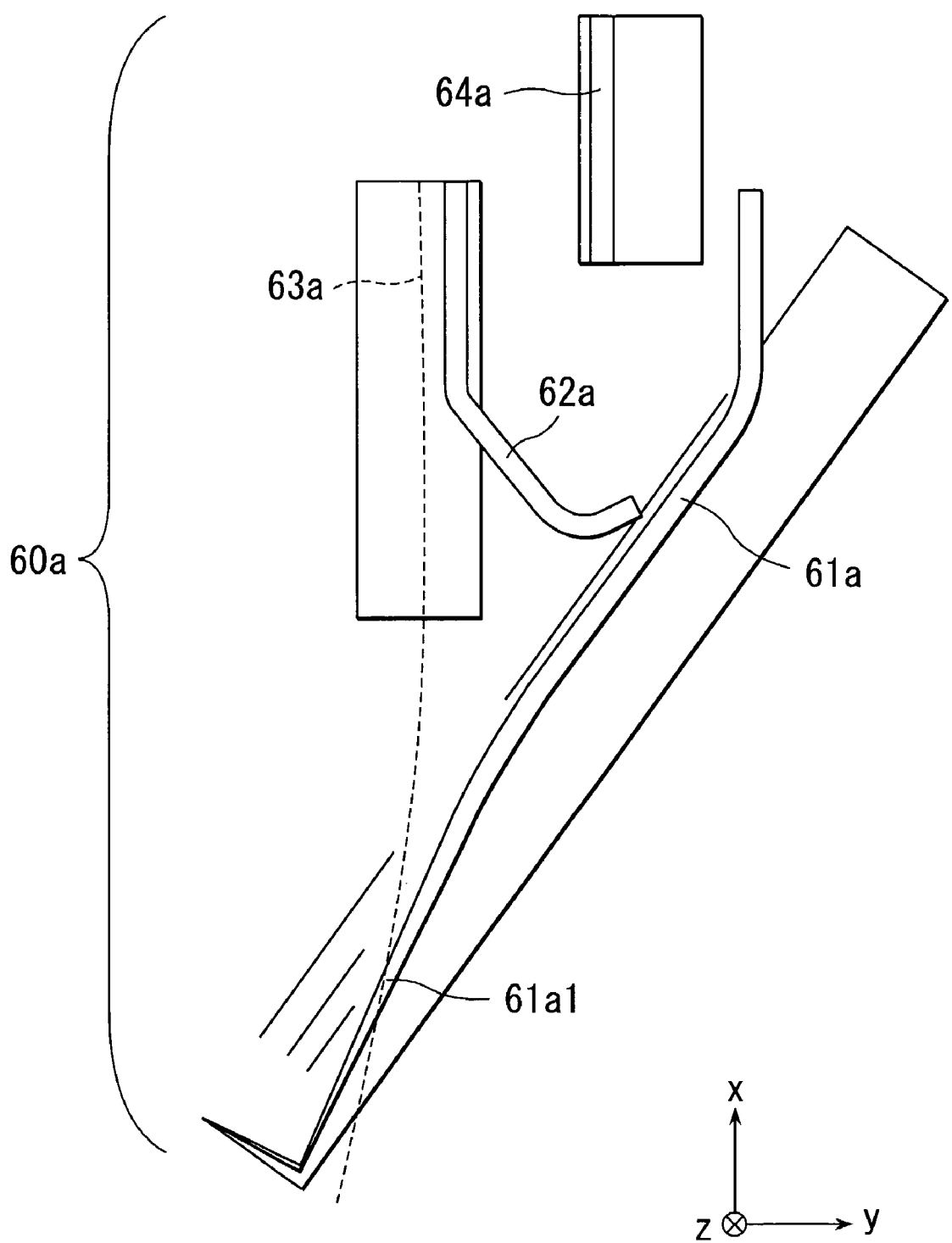
FIG. 16 is a top plan view showing the cam portion of FIG. 15.

With reference to FIGS. 15 and 16, a card connector according to a second embodiment is similar to that of the first embodiment except for their cam portion 60 and 60a.

The cam portion 60a is one obtainable by making cuts into a mother material of the metal cover 10 to form two or more predetermined pieces of rectangular shapes, followed by bending and raising the predetermined pieces.

The thus-formed cam portion 60a comprises a first guide portion 61a, a receiving portion 62a, a guide portion 63a and a supplemental guide portion 64a. The first guide portion 61a is provided with the warped portion 61a1. The warped portion 61a1 receives the cam follower 50 and guides along the first guide portion 61a when the cam follower 50 is moved forwards. On the other hand, the warped portion 61a1 constitutes, in cooperation with the guide portion 63a, a second guide portion of this embodiment and guides the cam follower 50 along the second guide portion so that the cam follower 50 is allowed to get over the first guide portion 61a and to return back to the initial position when the cam follower 50 is moved rearwards. The cam portion 60b also meets the requirements illustrated in FIG. 4 so that an ejection mechanism similar to that of the first embodiment can be achieved.

Third Embodiment

Figure 17:
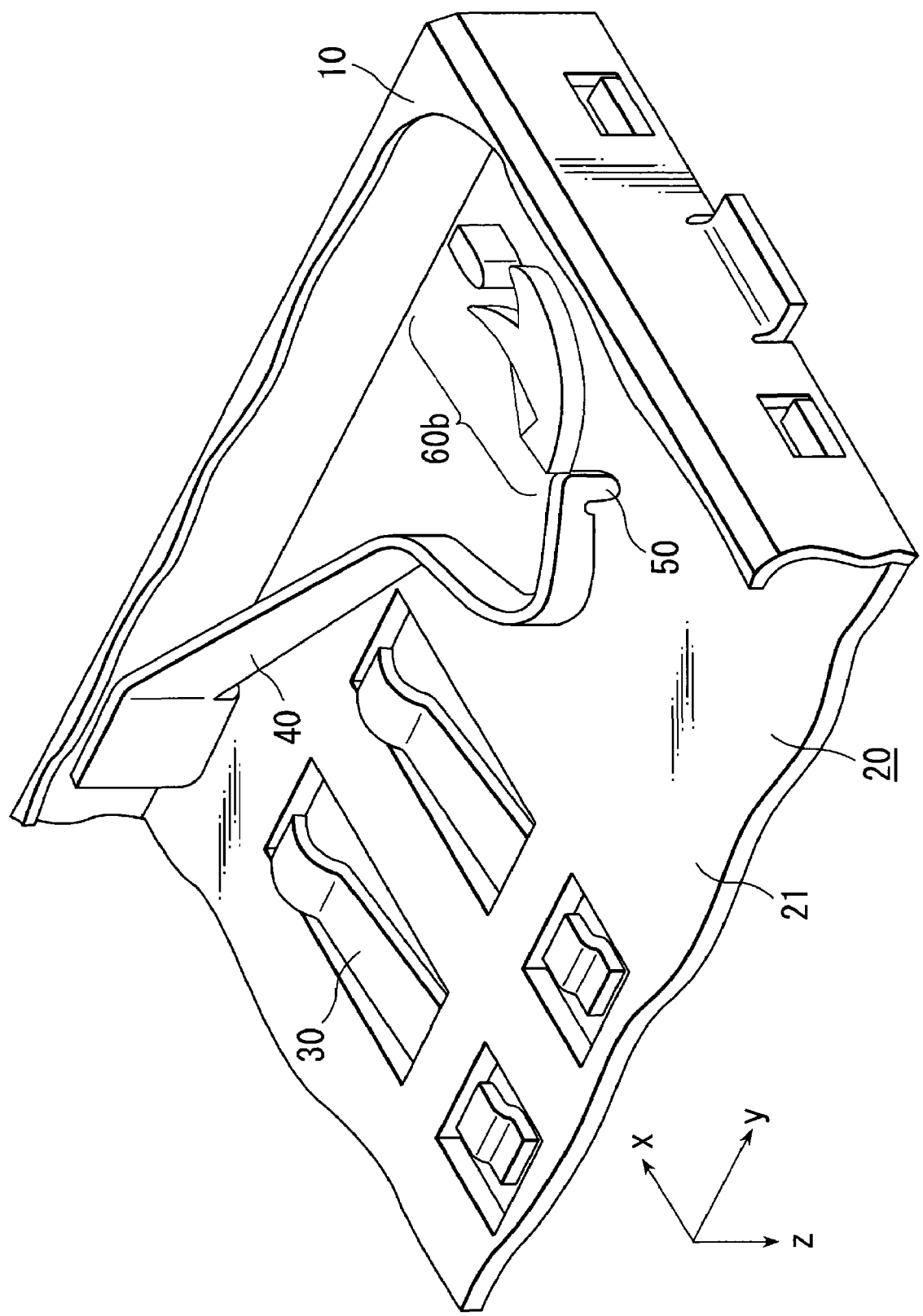
FIG. 17 is a perspective view showing, in part, a metal cover and a base member both included in a card connector according to a third embodiment of the present invention, wherein the metal cover is cut away for the sake of better understanding; a cam portion is formed integrally with the base member.
Figure 18:
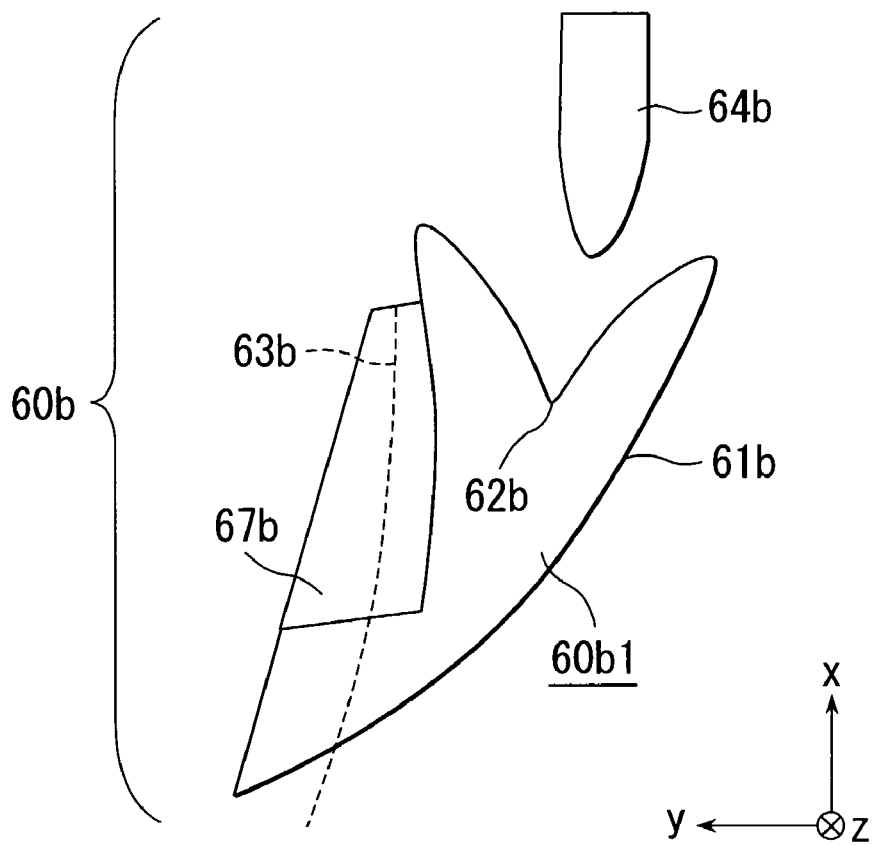
FIG. 18 is a top plan view showing the cam portion of FIG. 17.
Figure 19:
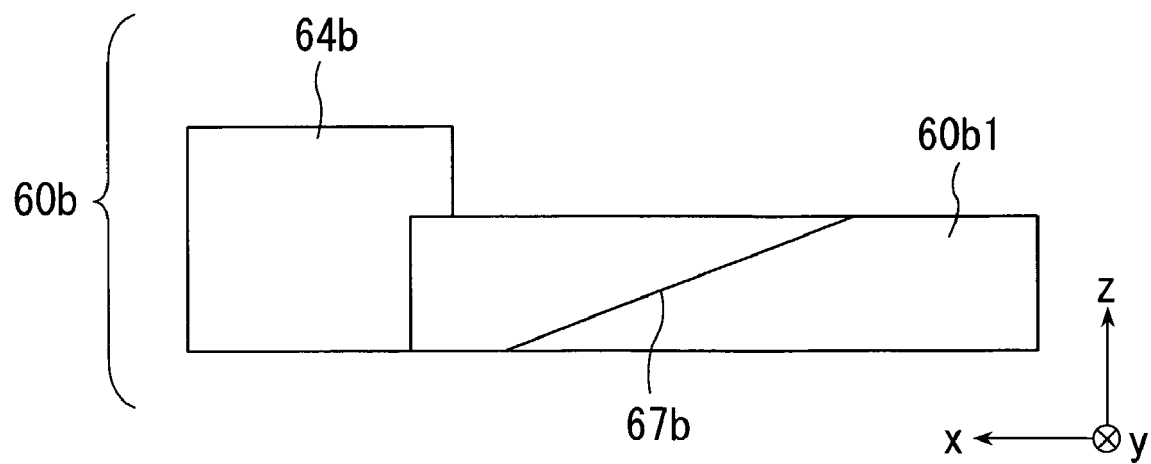
FIG. 19 is a left side view showing the cam portion of FIG. 17.

With reference to FIGS. 17 to 19, a card connector according to a third embodiment comprises a cam portion 60b which is formed integrally not with the metal cover 10 but with the base member 20. In detail, the base member 20 has a surface 21 which faces the general plate portion of the metal cover 10 under its combined state; the cam portion 60b is formed on the surface 21. The cam portion 60b may be formed upon molding process of the base member.

As best shown in FIG. 18, the cam portion 60b is comprised of two islands; one island 60b1 constitutes a first guide portion 61b, a receiving portion 62b and a second guide portion 63b; the other island constitutes a supplemental guide portion 64b.

The island 60b1 generally has a constant thickness except for a slope portion 67b. The first guide portion 61b and the receiving portion 62b are constituted by side surfaces of the island 60b1. The second guide portion 63b is constituted by a top surface of the island 60b1 including the slope portion 67b. The supplemental guide portion 64b has a thickness thicker than that of the island 60b1, as best shown in FIG. 19. The cam portion 60b also meets the requirements illustrated in FIG. 4 so that an ejection mechanism similar to that of the first embodiment can be achieved.

Figure 20:
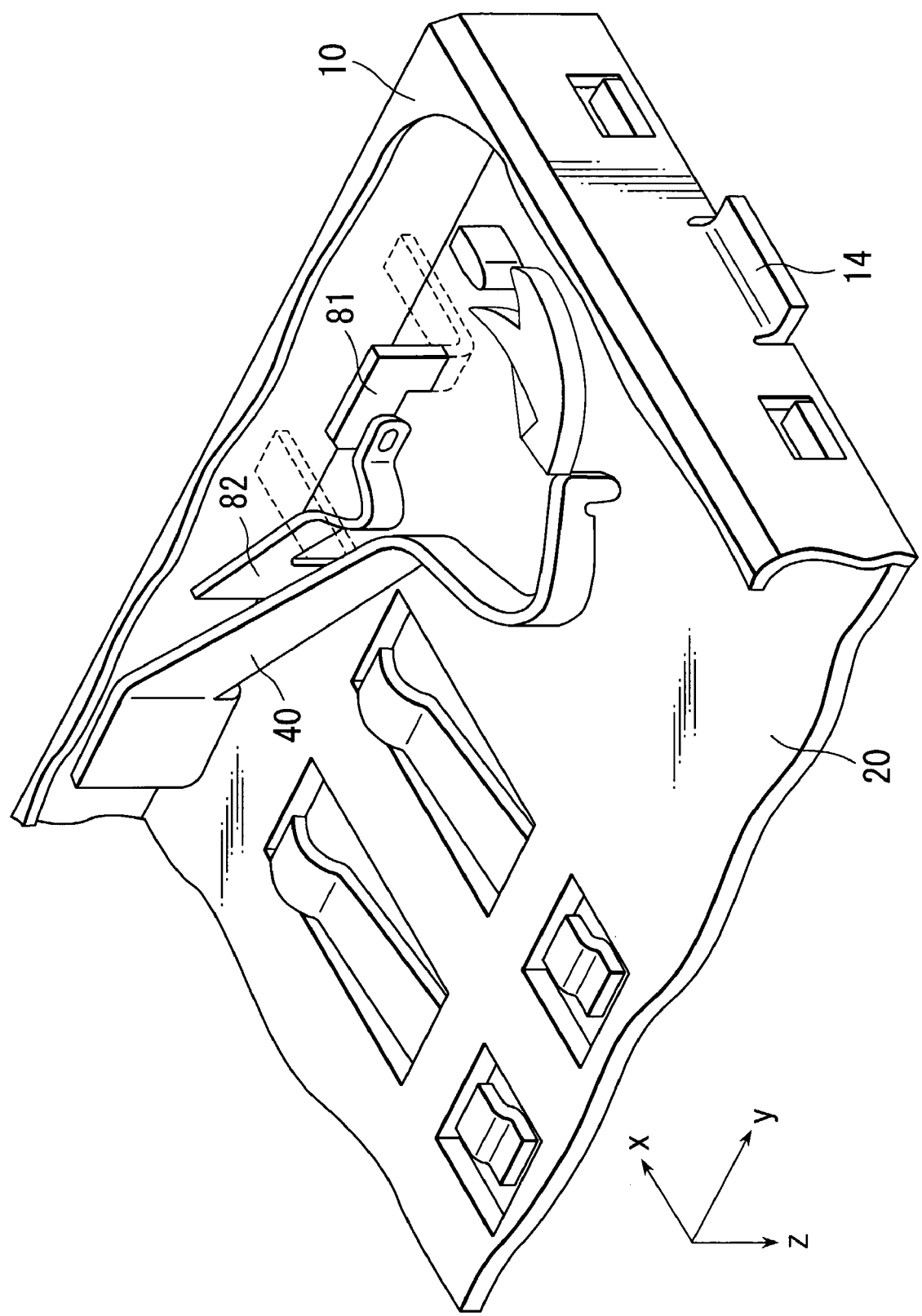
FIG. 20 is a view similar to FIG. 17, but in which two electrodes are further held by the base member, wherein the electrodes constitute a detection switch for detecting a card insertion/ejection operation.

As shown in FIG. 20, the card connector further comprises two electrodes 81, 82 which are held by the base member 20 and constitute a detection switch for detecting a card insertion/ejection operation.

Figure 21:
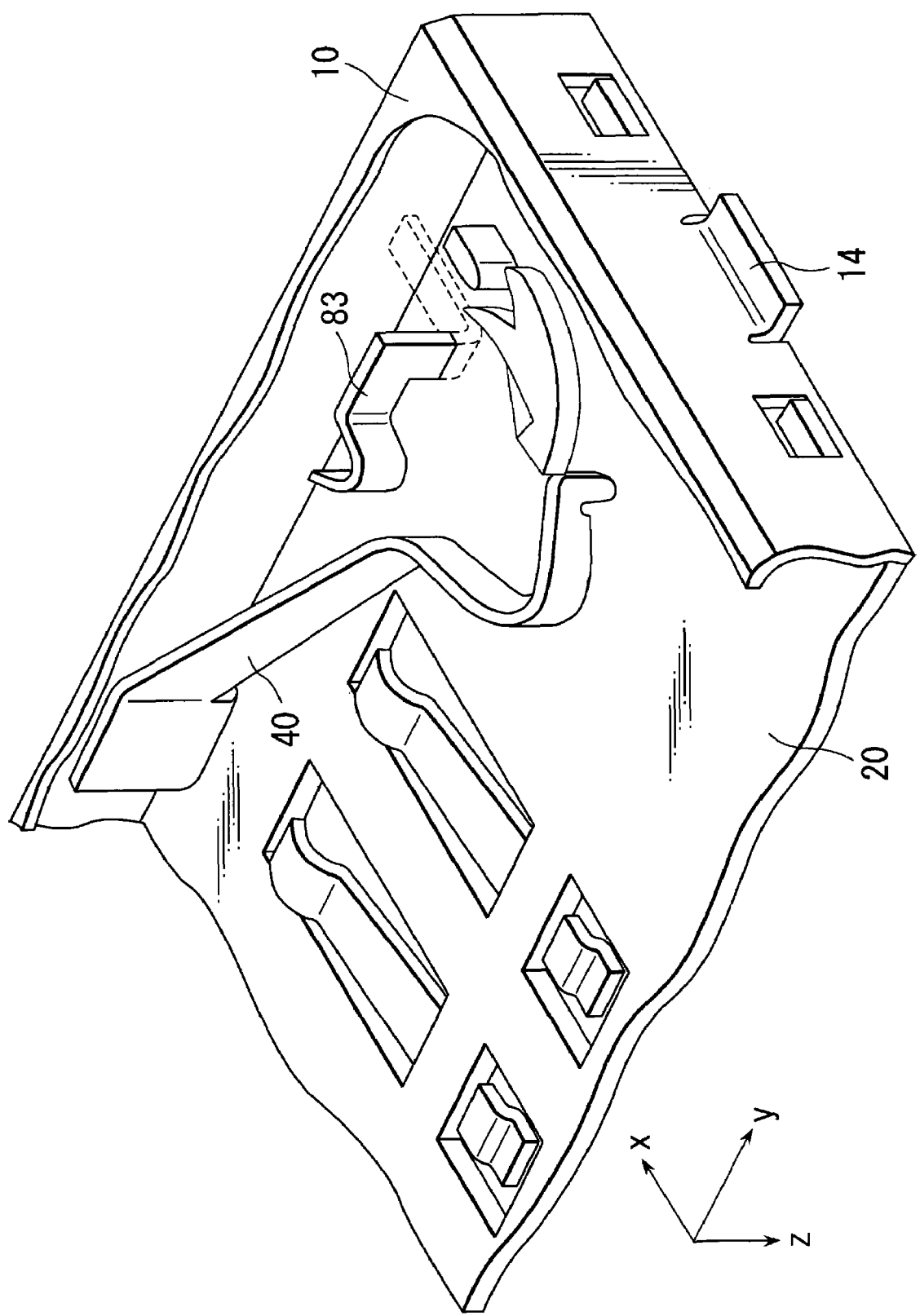
FIG. 21 is a view similar to FIG. 17, but in which one electrode is further held by the base member, wherein the electrode and the resilient supporter constitute a detection switch for detecting a card insertion/ejection operation.

Alternatively, as shown in FIG. 21, the card connector further comprises an electrode 83 held by the base member 20, wherein the electrode 83 constitutes, in cooperation with the resilient supporter 40, a detection switch for detecting a card insertion/ejection operation.

While there has been described what is believed to be the preferred embodiment of the invention, those skilled in the art will recognize that other and further modifications may be made thereto without departing from the sprit of the invention, and it is intended to claim all such embodiments that fall within the true scope of the invention.

The invention claimed is:

1. A card connector for connecting an electronic card with an electronic device, the connector comprising:
   a base member;
   a metal cover which defines, in cooperation with the base member, a receptacle for receiving at least partially the electronic card therein; and
   an ejection mechanism for ejecting the electronic card, at least in part, from the receptacle, the ejector mechanism comprising:
   a cam portion which is disposed within the receptacle and forms, at least in part, a cam path;
   a cam follower; and
   a resilient supporter which is formed integrally with the metal cover and supports the cam follower to allow the cam follower to travel along the cam path.

2. The card connector according to claim 1, the electronic card having a standardized cut corner potion which defines a particular triangle space within the receptacle when the electronic card is inserted into the receptacle, wherein the cam portion is disposed within the particular triangle space.

3. The card connector according to claim 1, wherein:
   the cam follower projects in a first direction perpendicular to a predetermined plane which is defined by second and third directions, the second direction being equal to a card insertion/ejection direction and being perpendicular to the first direction, the third direction being perpendicular to the first and the second directions; and
   the cam path is defined on the predetermined plane, as the cam portion is seen from the first direction.

4. The card connector according to claim 3, wherein:
   the predetermined plane is a polar coordinate plane which has an origin point and an origin straight line passing through the origin point; and
   the resilient supporter urges the cam follower to be positioned, on the predetermined plane, at an initial position which is an intersection point of a predetermined circle and a predetermined straight line, the predetermined circle having a center point on the origin point and a predetermined radius, the predetermined straight line passing through the origin point and making a predetermined angle with the origin straight line.

5. The card connector according to claim 4, wherein the cam portion comprises:
   a first guide portion constituting a guide line segment, the guide line segment extending from a first point to a second point, the first point being located within a first region and being identified by a first radius and a first angle on the predetermined plane, the first region being one of an inside region and an outside region of the predetermined circle, the second point being located within a second region and being identified by a second radius and a second angle, the first angle being greater than the second angle, the second region being one of the inside region and the outside region of the predetermined circle and being different from the first region; the guide line segment intersecting the predetermined circle at an additional intersection point, the additional intersection point being identified by the predetermined radius and an additional predetermined angle, the additional predetermined angle being smaller than the predetermined angle;
   a receiving portion for receiving the cam follower, the receiving portion forming a V-like line, the V-like line passing through third to fifth points, the third to the fifth points being located within the second region, the third point being identified by a third radius and a third angle, the third angle being greater than the second angle, the third point being positioned between the second point and the predetermined circle in a radial direction, the fourth point being identified by a fourth radius and a fourth angle, the fourth angle being greater than the third angle, the fourth point being positioned between the third point and the predeihermined circle in the radial direction, the fifth point being identified by a fifth radius and a fifth angle, the fifth angle being smaller than the fourth angle; and
   a second guide portion for guiding the cam follower from a sixth point to the initial position upon the ejection of the electronic card, the sixth point being located on the predetermined circle and corresponding to the fifth Point.

6. The card connector according to claim 5, wherein:
the resilient supporter comprises a first portion and a second portion, the first portion being for providing the cam follower with a circumferential force, the second portion being for providing the cam follower with a radial force, the circumferential force being a force that urges the cam follower to be on the predetermined line, the radial force being a force that urges the cam follower to be on the predetermined circle; and
the second guide portion guides the cam follower from the sixth point to the initial position by using the circumferential force.

7. The card connector according to claim 6, further comprising a supplemental resilient portion for providing the resilient supporter with a supplemental force for supplementing the circumferential force.

8. The card connector according to claim 7, wherein the supplemental resilient portion is formed integrally with the metal cover.

9. The card connector according to claim 6, wherein:
the first portion extends, at least in part, in the radial direction on the predetermined plane and has an end on another circle whose center point is the origin point and which is smaller than the predetermined circle; and
the second portion is connected to the end of the first portion and supports the cam follower.

10. The card connector according to claim 9, wherein the first portion comprises a base portion and a movable portion, the base portion extending in parallel with the origin line on the predetermined plane, the movable portion being connected with the base portion and extending from the origin point to the end of the first portion.

11. The card connector according to claim 9, wherein the second portion comprises a bent portion.

12. The card connector according to claim 11, wherein the bent portion is positioned farther from the origin line than the end of the first portion in a circumferential direction and serves as a transmission portion, the transmission portion transmitting an insertion force of the electronic card to the cam follower upon the card insertion, the transmission portion transmitting a movement of the cam follower as an ejection force to the electronic card upon the card ejection.

13. The card connector according to claim 5, wherein the cam portion further comprises a supplemental guide portion for guiding the cam follower towards the receiving portion after the cam follower passes through the second point upon the card insertion, the supplemental guide portion constituting a supplemental guide line segment, the supplemental guide line segment extending from a first supplemental point to a second supplemental point on the predetermined plane and intersecting a straight line extending from the second point to the fifth point, the first supplemental point being identified by a first supplemental radius and a first supplemental angle, the second supplemental point being identified by a second supplemental radius and a second supplemental angle, the first supplemental angle being greater than the second supplemental angle, the second supplemental angle being smaller than the second angle and the fifth angle, the second supplemental point being positioned between the second point and the predetermined circle in the radial direction.

14. The card connector according to claim 13, wherein the first supplemental point is positioned between the third point and the predetermined circle in the radial direction.

15. The card connector according to claim 13, wherein the first guide portion, the receiving portion, the second guide portion and the supplemental guide portion are formed integrally with each other.

16. The card connector according to claim 15, wherein:
the second guide portion is formed with a depression portion on the sixth point, the depression portion being depressed downwardly in the first direction in comparison with the fifth point of the receiving portion, the depression portion serving to guide the cam follower on the predetermined circle after the cam follower passes through the fifth point; and
the cam portion further comprises a connection portion which connects between the depression portion and the supplemental guide portion.

17. The card connector according to claim 5, wherein the second guide portion comprises a slope portion, the slope portion being positioned on the predetermined circle on the predetermined plane and being sloped towards an orientation opposed to a projection orientation of the cam follower in the first direction, the slope portion serving to guide the cam follower towards the initial position over the additional intersection point after the cam follower is away from the sixth point.

18. The card connector according to claim 1, wherein the cam portion is formed integrally with the metal cover.

19. The card connector according to claim 18, wherein the cam portion is one obtainable by stamping out a mother material of the metal cover to form a predetermined piece of a mitten-like shape, followed by bending the predetermined piece two times or more, the predetermined piece extending from a general plate portion of the metal cover.

20. The card connector according to claim 18, wherein the cam portion is one obtainable by making cuts into a mother material of the metal cover to form two or more predetermined pieces of rectangular shapes, followed by bending and raising the predetermined pieces.

21. The card connector according to claim 5, wherein the cam portion is formed integrally with the metal cover and is one obtainable by making cuts into a mother material of the metal cover to form two or more predetermined pieces of rectangular shapes, followed by bending and raising the predetermined pieces, the first guide portion being curved gently at the additional intersection point.

22. The card connector according to claim 1, wherein the cam portion is formed integrally with the base member.

23. The card connector according to claim 1, further comprising two electrodes which are held by the base member and constitute a detection switch for detecting a card insertion/ejection operation.

24. The card connector according to claim 1, further comprising first and second electrodes, the first electrode being held by the base member, the second electrode being formed integrally with the metal cover, the first and the second electrodes constituting a detection switch for detecting a card insertion/ejection operation.

* * * * *